Feb. 19, 1952 J. A. TAYLOR ET AL 2,585,974
ELECTRICAL INDICATING DEVICE
Filed April 3, 1950
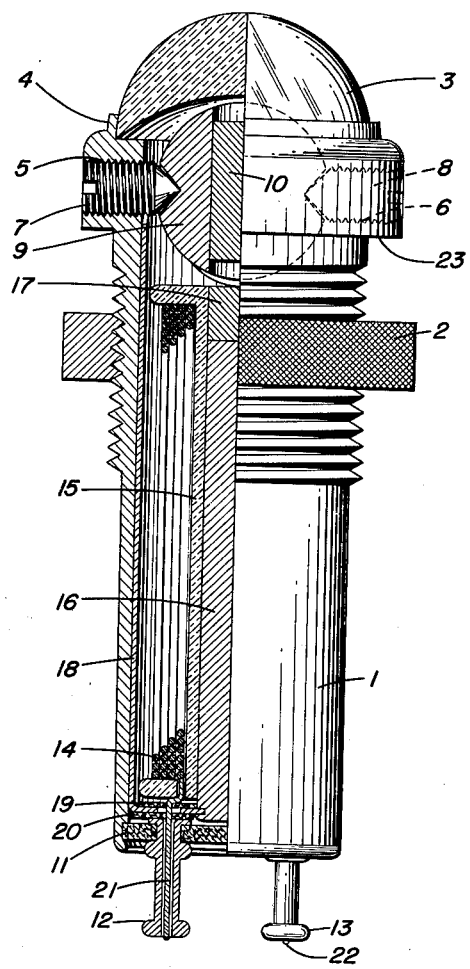
Inventors
JOHN A. TAYLOR
MILTON A. KNIGHT
By
Walter S. Pawl
Attorney Patented Feb. 19, 1952

2,585,974

UNITED STATES PATENT OFFICE 2,585,974

ELECTRICAL INDICATING DEVICE

John A. Taylor, Arlington, and Milton A. Knight, Clifton, Va.

Application April 3, 1950, Serial No. 153,684

9 Claims. (Cl. 177—329)

(Granted under the act of March 3, 1883, as amended April 30, 1928; 370 O. G. 757)

This invention relates to electrical indicator devices, and more specifically to such devices for indicating visually whether a circuit is on or off.

The object of this invention is to devise a simple and reliable instrument for showing whether a particular circuit is completed or broken.

A further object is to construct this instrument so as to occupy a minimum area on an instrument panel with a maximum area of indicating surface on the face of the instrument.

A further object is to provide the above indicator with a spherical indicator element pivotally mounted on an axis parallel to the face of the indicator and including a permanent magnet mounted diametrically therein transversely of said axis, and to mount an electro-magnet extending axially back of said spherical element normally to said axis and including a permanent magnet for normally maintaining said spherical element in one rotational position, said electro-magnet being connected in a circuit for energization when said circuit is completed to induce a magnetic field of opposite polarity to its permanent magnet, whereby the spherical element is turned 180° to expose the reverse half of its surface to view, said halves of said surface being colored differently to thereby provide a visual indication that the circuit is either completed or broken.

Other and more specific objects will become apparent in the following detailed description of a preferred embodiment of this invention, having reference to the accompanying drawing wherein:

The single figure shows a quarter sectional view of the indicator.

In our prior Patent No. 2,415,452, issued February 11, 1947, we described a similar indicator, but having a cylindrical indicator element and a spring for returning it to its normal rotational position instead of a permanent magnet incorporated in the electro-magnet.

It was discovered however that a more reliable and efficient device could be made by using a spherical indicator element and incorporating a small permanent magnet in the electro-magnet in place of the spring to hold the indicator in its normal broken circuit position. This makes a simpler arrangement providing for minimum space requirements on the instrument board on which the indicator is to be mounted, and a maximum indicator surface area. The elimination of the spring provides absolute freedom of rotation for the spherical element and a more reliable operation.

The indicator shown comprises a cylindrical body 1 having a threaded portion and a shoulder 23 for mounting against an instrument panel and a knurled lock nut 2 for locking it in place. A lens 3 is provided on the exposed end of said body and may be held in place by spinning the edge 4 over against the edge of the lens.

The body is radially tapped on opposite sides at 5 and 6 and provided with adjustable conical pivot screws 7 and 8 for the spherical indicator element 9 which has a permanent magnet 10 mounted therein. It is important that these pivot screws be set to obtain freedom of rotation for the indicator element without any looseness.

The rear end of the cylindrical body 1 is closed by a fibre disc 11 set into the counterbored end of the cylinder and the outer edge of the cylinder spun over it to hold it in place. A pair of brass nipples 12 and 13 are riveted in this disc and form external terminals for the electro-magnet coil 14 which is mounted on the spool 15 around the core 16. The end of the core adjacent the indicator element comprises a small permanent magnet 17 for normally holding the spherical element in one rotational position when the electro-magnet is not energized.

The core 16 is fixed in the bottom of an iron can 18 fitting snugly inside the body 1 and having its open end cut out to fit over the pivot screws and on opposite sides of said spherical element. A pair of fibre spacers 19 and 20 are placed on opposite sides of the bottom of the can 18, openings being provided in these spacers and the bottom of the can for passing the terminal wires 21 and 22 from the coil 14 through the nipples 12 and 13 respectively. The ends of these terminal wires are soldered in the ends of the corresponding nipples, which form the external terminals for connection into any circuit that it might be desired to check on by means of this indicator.

The normally exposed half of the surface of the indicator element may be colored yellow and the other half red, so that when the circuit is broken the indicator will show yellow; and when the circuit is completed, the magnetic circuit induced will be opposed to that of the small permanent magnet in the end of the core and will cause the spherical indicator element to flip over 180° and show the red surface.

The lens 3 may be glass or any other transparent plastic. The body and spool may also be made of suitable plastics.

The specific form illustrated may obviously be modified in various details. For example, the spherical indicator element 9 may be made cylindrical or any other suitable form, and the shape of the lens 3 may be accordingly changed.

Furthermore, the small permanent magnet 17 and core 16 may be replaced by a continuous permanent magnet extending the full length of the core but having a weak flux merely sufficient to normally hold the indicator element in its inoperative position. Or, the small magnet 17 might be slidably mounted and backed by a light spring in the core to normally hold it in the position shown, and to permit the small magnet to be retracted into the core when the coil 14 is energized. The iron can 18 may furthermore be omitted or replaced or supplemented by an iron sleeve around the small magnet inside the core of the coil.

A further modification may be made by forming an armature in place of the coil unit shown, comprising a pair of parallel soft iron bars extending normally from adjacent the opposite sides of the indicator element 9, and mounting the electromagnet coil between the other end of the bars, or between intermediate portions of the bars; and connecting the bars by a weak permanent magnet for normally maintaining a weak magnetic flux through the bars in one direction. To operate the indicator, the current is passed through the electromagnetic coil to pass an opposed magnetic flux through the bars, and thus reverse the indicator into operative position.

It will be noted that in all cases, the movable indicator with a permanent magnet is held normally in its inoperative position by a weak permanent magnet and is turned into its operative position by an electromagnet which is energized by closing a circuit to overcome the flux of the weak permanent magnet and move the indicator into operative position.

Many other obvious modifications may be made in the details and arrangement of parts without departing from the spirit and scope of this invention as defined in the appended claims.

The invention described herein may be manufactured and used by or for the Government of the United States of America for governmental purposes without the payment of any royalties thereon or therefor.

What is claimed is:

1. An on-off circuit indicator for direct current circuits comprising a permanent magnet, means for rotatably mounting said magnet on a transverse axis, and an electro-magnet extending normally to said axis and incorporating another permanent magnet of opposite polarity to that of the electro-magnet when energized located in the core of said electro-magnet, whereby said rotatable permanent magnet will retain a normal rotational position with respect to said other permanent magnet, and will turn 180° when said electro-magnet is energized to overcome said other permanent magnet and reverse the effective polarity thereof.

2. An on-off circuit indicator comprising indicator element, means for rotatably mounting said element, an electro-magnet extending transversely therefrom, a permanent magnet in said indicator element mounted diametrically transversely with respect to its axis of rotation, and a small permanent magnet in the core of said electro-magnet adjacent said indicator element and having its poles arranged in opposition to the poles of the electro-magnet when energized.

3. An on-off circuit indicator as defined in claim 2, wherein said electro-magnet has an energizing coil with external terminals for connection into a circuit to determine whether the circuit is on or off.

4. An on-off circuit indicator as defined in claim 3, including a cylindrical casing for said indicator element and said electro-magnet, said external terminals projecting from one end of said casing, and a lens over the other end of the casing for viewing the position of said indicator element.

5. An on-off circuit indicator as defined in claim 4, wherein said indicator element is spherical, and has its opposite halves corresponding to the two poles of its permanent magnet colored differently to distinguish the on and off conditions of the circuit.

6. An on-off circuit indicator as defined in claim 5, wherein said casing has means for attachment in an opening in an instrument panel or the like, and the diameter of said spherical indicator element is substantially equal to the inner diameter of said casing to provide maximum visual area of the indicator color on an indicator occupying a minimum of space on the instrument panel or the like.

7. An on-off circuit indicator as defined in claim 6, wherein said casing is tapped radially on opposite sides near its lens end, and conical pivot screws for said spherical indicator element in said tapped sides adjustable to provide a snug but free bearing for said element.

8. An on-off circuit indicator for direct current circuits comprising an indicator with a permanent magnet rotatably mounted about the transverse axis of said magnet, a weak permanent magnet for maintaining said indicator in its normal inoperative position about said axis, and an electro-magnet having its core located coaxially with said weak permanent magnet and energized by a direct current circuit for reversing the flux of said weak permanent magnet to rotate said indicator into its operative position about said axis.

9. An on-off circuit indicator having a movable permanent magnet indicator element mounted for movement into operative and inoperative positions, a weak permanent magnet mounted adjacent to said element for normally holding it in inoperative position, and an electromagnetic coil wound about said weak permanent magnet and energized by closing a circuit for overcoming the effect of said weak permanent magnet and moving said element into operative position.

JOHN A. TAYLOR.
MILTON A. KNIGHT.

REFERENCES CITED

The following references are of record in the file of this patent:

UNITED STATES PATENTS

| Number | Name | Date |
|---|---|---|
| 2,245,493 | Nothe | June 10, 1941 |
| 2,367,299 | McLarn et al. | Jan. 16, 1945 |
| 2,388,448 | Sundt et al. | Nov. 6, 1945 |
| 2,415,452 | Taylor et al. | Feb. 11, 1947 |